United States Patent [19]

Green et al.

[11] 3,859,717

[45] Jan. 14, 1975

[54] METHOD OF MANUFACTURING CONTROL ELECTRODES FOR CHARGE COUPLED CIRCUITS AND THE LIKE

[75] Inventors: Robert D. Green; Gary L. Heimbigner, both of Anaheim, Calif.

[73] Assignee: Rockwell International Corporation, El Segundo, Calif.

[22] Filed: Dec. 21, 1970

[21] Appl. No.: 99,944

[52] U.S. Cl. .......................... 29/571, 29/589, 357/24

[51] Int. Cl. .............................................. B01j 17/00

[58] Field of Search ............. 29/571, 578, 580, 589, 29/590, 591, 576; 317/235; 204/15

[56] References Cited

UNITED STATES PATENTS

| | | | |
|---|---|---|---|
| 3,407,479 | 10/1968 | Fordenwalt et al. | 29/577 |
| 3,411,051 | 11/1968 | Kilby | 317/235 |
| 3,576,478 | 4/1971 | Watkins | 29/578 |
| 3,623,217 | 11/1971 | Kawagoe et al. | 29/571 |
| 3,654,499 | 4/1972 | Smith | 307/304 |
| 3,699,011 | 10/1972 | Nishimura | 204/15 |
| 3,745,647 | 7/1973 | Boleky | 29/571 |
| 3,770,988 | 11/1973 | Engeler | 317/235 |

FOREIGN PATENTS OR APPLICATIONS

| | | |
|---|---|---|
| 7,106,968 | 1/1972 | Netherlands |

*Primary Examiner*—Roy Lake
*Assistant Examiner*—W. C. Tupman
*Attorney, Agent, or Firm*—H. Fredrick Hamann; G. Donald Weber, Jr.; Robert Ochis

[57] ABSTRACT

A method of manufacturing charge coupled devices having first and second groups of interdigitated control electrodes insulated from one another.

4 Claims, 8 Drawing Figures

INVENTOR
ROBERT D. GREEN
GARY L. HEIMBIGNER
BY Robert G. Rogers
ATTORNEY

INVENTORS
ROBERT D. GREEN
GARY L. HEIMBIGNER
BY Robert G Rogers
ATTORNEY

INVENTORS
ROBERT D. GREEN
GARY L. HEIMBIGNER
BY
Robert G. Rogers
ATTORNEY

INVENTORS
ROBERT D. GREEN
GARY L. HEIMBIGNER
BY Robert G. Rogers
ATTORNEY

METHOD OF MANUFACTURING CONTROL ELECTRODES FOR CHARGE COUPLED CIRCUITS AND THE LIKE

BACKGROUND OF THE INVENTION

1. Field of the Invention

The invention relates to control electrodes and a process for producing the control electrodes for a charge coupled circuit.

2. Description of Prior Art

Control electrodes may also be referred to as capacitor electrodes. As is well known, when a voltage is applied to an electrode on an insulated layer over a semiconductor substrate, either a depletion region or an inversion layer is formed in the substrate. The depletion region is formed when there is an absence of carriers and the inversion layer is formed when carriers are available. The charge comprising the inversion layer is then shifted to an adjacent electrode as a function of the voltage applied to the adjacent electrode. In a charge coupled circuit, electrodes are connected to clock signals which overlap in time slightly so that the charge can be coupled, or transferred from one electrode to another electrode before the bias on the first electrode as provided by the clock signal is removed.

For a further description of charge coupled circuits, please refer to U.S. Pat. No. 3,623,123 by Robert D. Green, one of the present inventors hereof.

At the present time, one embodiment of a process used to fabricate control electrodes for a charge coupled circuit requires critical mask dimensions since extremely small spacing between the charge coupling electrodes has to be maintained. The spacing is on the order of 1.5$\mu$m. The small dimensions reduce the practical utility of such charge coupled circuits.

In addition, existing charge coupled circuits require at least three clocks, $\phi_1$, $\phi_2$, and $\phi_3$, for normal operation. As a result topology, or layout, problems are incurred. Ordinarily, a diffused undercrossing with a pair of contacts are required for implementing each bit of a charge coupled shift register.

SUMMARY OF THE INVENTION

The present invention provides control electrodes for charge coupled or other circuits and a process for producing the charge coupled electrodes which reduces the dimension limitations imposed by existing techniques, and overcomes the layout problem required to produce the electrodes. The invention is not limited to a three phase clock system. As a result, it can be used with other multiple phase clocking schemes such as four phase clock signals.

Briefly, control electrodes are produced for charge coupled circuits using one or more types of conducting materials such as a semiconductor material and conducting metals for adjacent electrodes. The control electrodes are interdigitated and electrically insulated from each other.

Typically, a charge coupled device comprises a semiconductor substrate on which a dielectric layer has been formed. In one embodiment of the invention one group of electrodes of a semiconductor material, such as polycrystalline silicon is formed over the dielectric layer by depositing a semiconductor layer and appropriately masking and etching the layer to define the electrodes. An opening in the insulating layer may be formed adjacent one electrode for producing an impurity region in the substrate. The impurity region when based provides charge for the charge coupled circuit. Subsequently, the electrodes are coated with an insulating film such as silicon dioxide. A conducting metal layer, such as aluminum, is deposited over the surface of the insulated semiconductor electrodes, appropriately masked and etched to form a second group metal electrodes which are interdigitated with the first group of semiconductor electrodes and are spaced therefrom by a distance established by the thickness of the insulating film. The metal electrodes overlap the semiconductor electrodes slightly for enhancing the transfer of charge between the control electrodes.

In other embodiments the electrodes may be produced from the same or different metals where one metal is coated with an insulating film such as anodized aluminum. In a preferred embodiment, the insulating film is formed automatically during the process. Moreover, the first group of electrodes may be of metal while the second group of electrodes may be of semiconductor material or metal.

As a result, a high performance charge coupled circuit can be produced without the necessity for critical alignment of adjacent control electrodes and line widths. The process can also be used to produce self-aligned field effect transistor arrays and is extendable to bipolar device fabrication or a combination of both. Circuits other than charge coupled circuits such as shift registers using closely spaced electrodes are also within the scope of the invention.

In addition, since the electrodes are insulated from each other, crossovers are permitted. As a result, charge coupled circuits using multiple phase clocking signals including three phase, four phase, five phase, etc. may be used without encountering difficult layout problems.

Therefore it is an object of this invention to provide a process for producing and the resulting product comprising improved control electrodes for charge coupled circuits and other circuits requiring closely positioned adjacent electrodes.

A still further object of the invention is to provide a process for producing charge coupled arrays compatible with self-aligned field effect transistor array fabrication and which is extendable to bipolar device fabrication or a combination of both.

A still further object of this invention is to provide a process for producing charge coupled devices using two types of capacitor electrodes which enable high device performance without requiring critical alignment and line widths.

A further object of this invention is to provide a process for producing control electrodes for charge coupled circuits without the necessity for diffused undercrossing.

A still further object of this invention is to provide a process for producing charge coupled device arrays which reduces the requirements imposed on photomasking techniques and which eliminates clock line layout problems.

A further object of this invention is to provide interdigitated control electrodes of a charge coupled circuit produced from different conducting materials for enabling alternate conductors to overlap adjacent conductors without making electrical contact.

A further object of this invention is to provide a charge coupled circuit in which alternate capacitor electrodes are produced from a semiconductor material and in which the remaining electrodes are produced from a conducting metal which overlaps the semiconductor electrodes slightly without making electrical contact therewith.

Other objects and advantages of the invention will be apparent from the following description in connection with the accompanying drawings.

BRIEF DESCRIPTION OF DRAWINGS

FIG. 6 also shows a contact to the semiconductor control electrode of the previously formed device.

DESCRIPTION OF PREFERRED EMBODIMENTS

Figure 1:
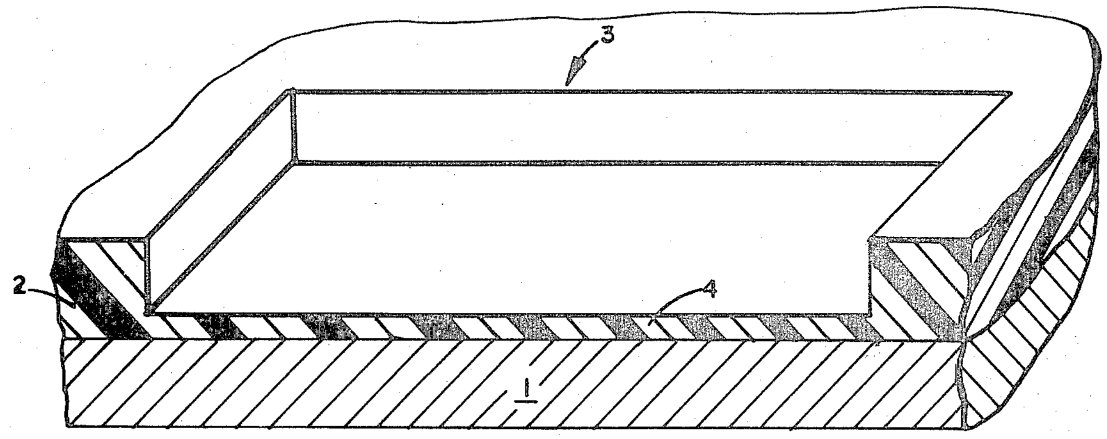
FIG. 1 is a perspective view of a semiconductor substrate covered by an insulating layer which has been masked and etched to form a region in which a charge coupled circuit can be produced, and includes a cross-sectional view taken in a generally vertical plane through the semi-conductor substrate and insulating layer.

FIG. 1 is a cross-sectional view of substrate 1 including dielectric insulating layer 2 disposed over the surfce of the substrate.

Single crystal silicon may be used as substrate 1 and silicon dioxide ($SiO_2$) may be used as the dielectric layer 2. The dielectric layer may be formed by oxidation or deposition techniques. Other materials and processes known to persons skilled in the art may also be utilized.

The dielectric layer 2 has been masked and etched to form recessed region 3 in the dielectric layer 2. The photomasking and etching steps required to remove the dielectric layer for forming the recessed region are well known to persons skilled in the art.

The dielectric layer within region 3 may be completely removed and reformed as the thin layer 4 or etched to the thickness of the thin layer 4. The relatively thin dielectric layer 4 should have a thickness for enabling the electrodes, i.e., device electrodes and charge coupled electrodes described infra, to control conduction in the subjacent substrate under appropriate operating conditions. The relatively thick portion of the dielectric layer 2 has a thickness sufficient reduce the electrode to substrate capacitance to a low enough level to prevent harmful effects as a result of parasitic capacitances.

Figure 2:
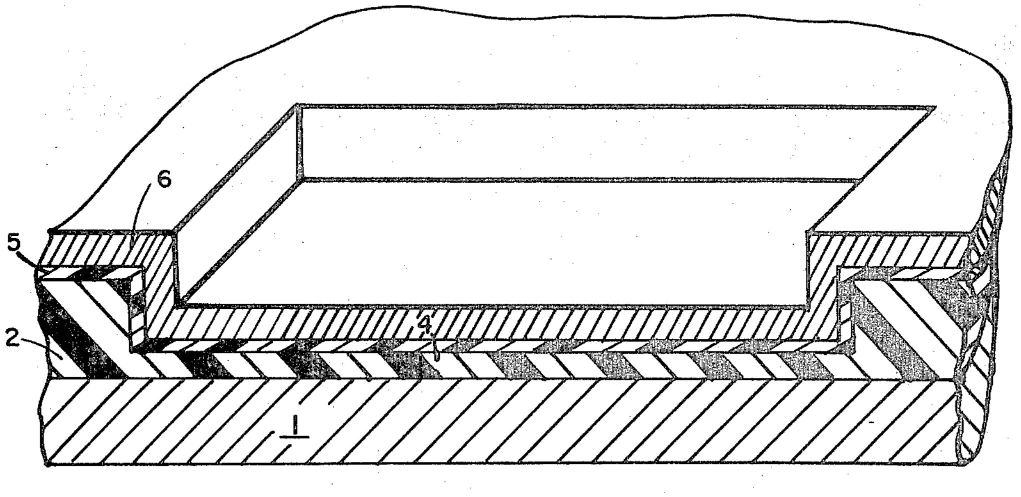
FIG. 2 is a view of the FIG. 1 structure in which a dielectric insulating layer and layer of semiconductor material are shown deposited over the relatively thin insulating layer in the region designated for the charge coupled circuit.

FIG. 2 is a view of the FIG. 1 structure including a second dielectric layer 5 formed over the first dielectric layer 2 and in particular over the relatively thin layer 4. The second dielectric layer may be a deposited silicon nitride layer which protects the surface from diffusions and contamination through the relatively thin portion 4 of the dielectric layer 2. As an example, the thin portion 4 of the first dielectric layer may have a thickness of between 500 – 1000A and the second dielectric layer 5 may have a thickness of between 200 - 400 A. The figures are not drawn to scale.

FIG. 2 also illustrates semiconductor layer 6 deposited over the second dielectric layer 5. The semiconductor layer 6, which may be polycrystalline silicon in one embodiment, may have a thickness of approximately 10,000 A. processes for depositing such a semiconductor layer are well known to persons skilled in the art.

Figure 3:
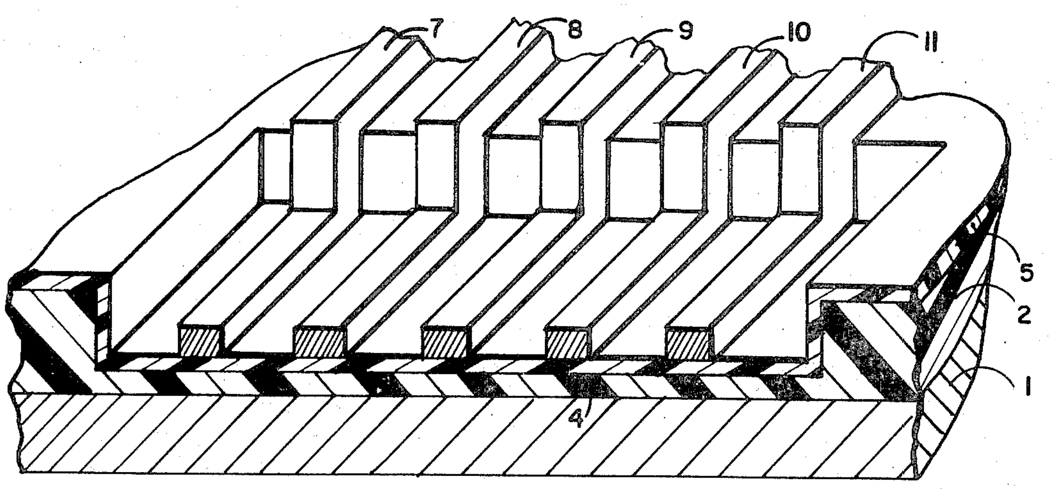
FIG. 3 is a view of the FiG. 2 structure in which the semiconductor material has been masked and etched to form electrodes of a charge coupled circuit.

FIG. 3 is a view of the FIG. 2 structure in which the semiconductor layer 6 masked and etched to form semiconductor strips 7, 8, 9, 10 and 11 over the dielectric layer 5 in the recessed region 3. The strips are arranged to form alternate conducting control electrodes as described subsequently. The semiconductor strips 7–11 are appropriately spaced for enabling the formation of additional electrodes between the strips. In other words, the final structure will ultimately comprise interdigitated electrodes with alternate electrodes comprising different conducting materials.

Figure 4:
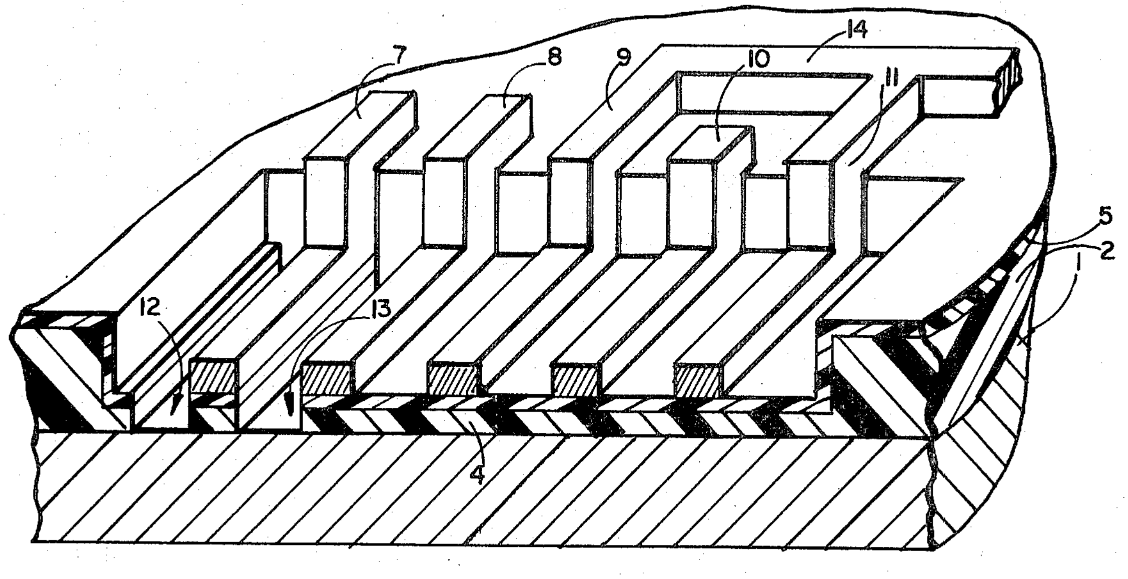
FIG. 4 is a view of the FIG. 3 structure in which the insulating layer adjacent one of the semiconductor electrodes has been masked and etched to expose; the surface of the substrate for forming a semiconductor device in the substrate with a self-aligned control electrode.

FIG. 4 is a view of the FIG. 3 structure in which at least a portion of the dielectric layer 5 on both sides of semiconductor strip 7 is masked and etched for exposing the underlying thin dielectric layer 4. The thin layer 4 is also etched using the dielectric layer 5 as a mask thus, substrate 4 is exposed on either side of strip 11. Openings 12 and 13 to the substrate 1 are formed on either side of the semiconductor strip 7. As shown in the figure, the strip is substantially centered between the openings.

In addition to illustrating the process for forming a charge coupled circuit, FIG. 4 also illustrates the initial steps of forming a semi-conductor gate field effect transistor. The process described herein is, therefore, compatible with a process for forming field effect transistors and charge coupled circuits during the same process cycle.

FIG. 4 also illustrates semiconductor strip 14 interconnecting the strips 9 and 11 so that one input signal can be provided to these strips currently. The terminations of strips 7, 8, and 10 are also clearly defined. Input connections to the 8 and 10 strips are are formed at the far side of the recessed region 3 in the portion of the structure which has been deleted from the figure by the cross-sectioning of the structure.

In other embodiments strip 10 may be paired with another strip and interconnected in the manner shown for strips 9 and 11.

Figure 5:
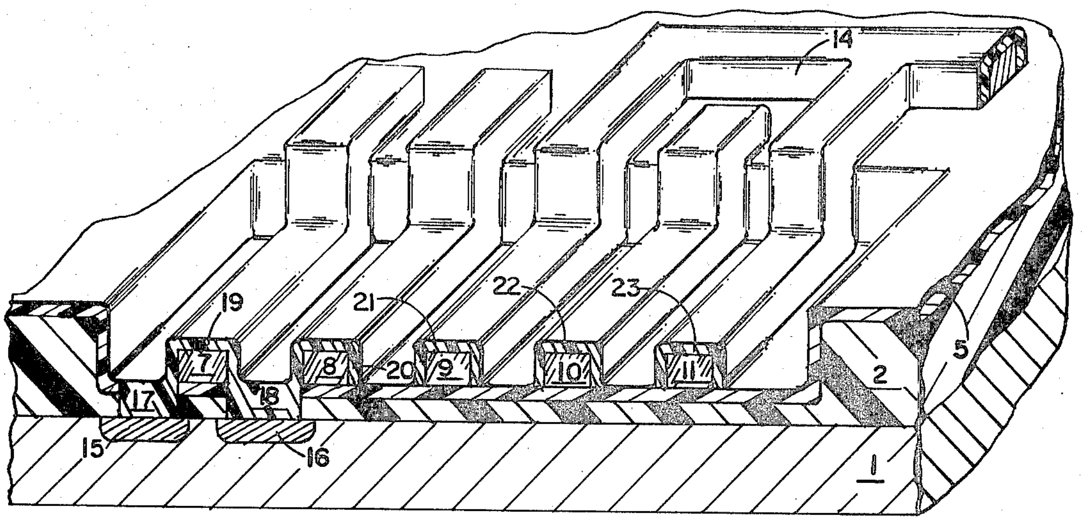
FIG. 5 is a view of the FIG. 4 structure in which semiconductor regions of a conductivity type different from the conductivity type of the substrate are formed in the substrate through openings provided in the insulating layer. During the formation of the different conductivity type regions by diffusion, an insulating film is formed over each of the semiconductor electrodes shown in FIG. 5 and the previously formed openings are filled.

FIG. 5 is a view of the FIG. 4 structure showing regions 15 and 16 formed in the substrate 1. The regions which have a conductivity different from the substrate, may be produced by diffusion techniques known to persons skilled in the art. For the particular embodiment, region 15 represents a source region for a MIS transistor and region 16 represents a drain region of the MIS transistor as well as a charge source for a charge coupled circuit utilizing the electrodes adjacent to the MIS transistor. In other words, diffused region 16 acts as a minority carrier source for the charge coupled device. In certain embodiments it may be used as a charge sink.

As indicated above, since strip 7 is used as the gate or control electrode for the MIS transistor also comprising regions 15 and 16, the gate electrode is automatically aligned with the region 15 and 16. Additional alignment techniques are, therefore, not required for producing field effect transistors using the present process.

If regions 15 and 16 are formed by diffusion, dielectric layers 17 and 18 are regrown (thermally oxidized) in the openings 12 and 13. If other techniques are used, it may be necessary to redeposit an insulating material in the openings. In that case, additional masking and etching steps are required.

As dielectric layers 17 and 18 are being reformed in the openings 12 and 13, a dielectric insulating film is formed over each of the semiconductor strips 7–11. The dielectric films over each of the strips are identified by the numerals 19 through 23. If a diffusion technique requiring a high temperature is used to form the regions 15 and 16, and assuming the strips 7–11 are comprised of polycrystalline silicon, the surface of the strip may be oxidized during the diffusion process, thereby forming; films 19–23 of silicon dioxide.

If insulating layer 5 is non-reactive to the oxidizing temperature, e.g., if silicon nitride is utilized as the layer 5, its thickness does not change during the forming of films 19–23 by thermal oxidization. If other processes are utilized, it may be necessary to reduce the thickness of the dielectric layer between the strips 7–11 prior to the formulation of films 19–23.

Figure 6:
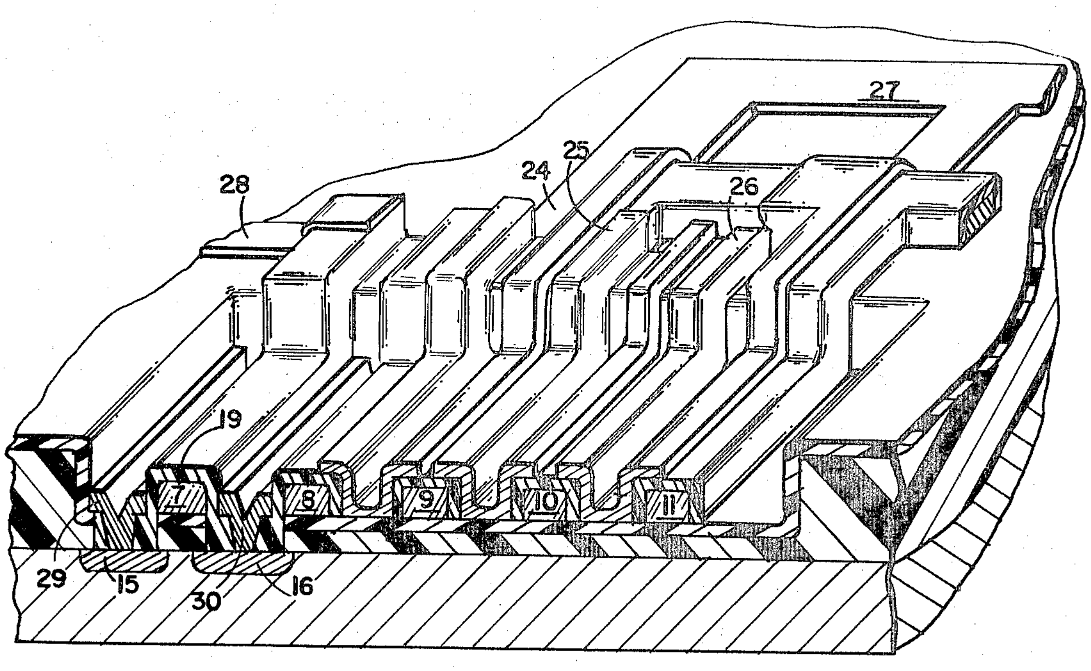
FIG. 6 is a view of the FIG. 5 structure showing the interdigitated control electrodes of a conducting metal between the semiconductor electrodes including signal input lines to certain electrode pairs.

FIG. 6 is a view of the FIG. 5 structure in which a conducting metal layer such as aluminum is deposited over the surface of the FIG. 5 structure, masked and etched for forming metal strips 24, 25, and 26 between semiconductor strips 8, 9, 10 and 11. The spacing between adjacent metal and semiconductor strips is established by the thickness of the insulating film therebetween. The metal strips form interdigitated control electrodes for the charge coupled device being produced. Metal strips 24 and 26 are interconnected by metal strip 27 for providing a single input line to strips 24 and 26 similar to the single input line 14 for conducting strips 9 and 11 as described in connection with FIG. 4. Metal strip 25 is connected to receive an input at the opposite ends therefor.

It is pointed out that strip 24 and 26 pass over the semiconductor strip 14 interconnecting the pair of semiconductor strips 9 and 11. Since an insulating film was formed over the semiconductor strips 7–11 and strip 14, the crossover does not involve an electrical short circuit. In a manner similar to the formation of the individual semiconductor strip 7–11 from the deposited layer of semiconductor material, the deposited metal layer is masked and etched so that individual metal strips 24–26 are formed. The metal strips 24–26 (metal control electrodes) slightly overlap the semiconductor strips (semiconductor control electrodes) for improving the transfer of charge from one electrode to an adjacent electrode as described in connection with the description of the operation of the circuit.

FIG. 6 also shows a conductor 28 which contacts semiconductor strip 7 through an opening in insulating film 19 which is formed prior to the deposition of the metal layer. Conductor 28 is used to provide a control signal to the strip 7 implementing a gate electrode for the field effect transistor. Contacts 29 and 30 associated with regions 15 and 16 respectively are also shown. These contacts, which may be provided with input conductors (not shown), are formed during the formation of the other metal strips, appropriate openings through dielectric layers 17 and 18 having been formed at the same time that the opening through insulating layer 19 was formed, prior to the deposition of the metal layer. An input conductor connected to strip 8 may also be provided at the opposing end of the recessed region 3. Layout techniques for providing such connections are as known to persons skilled in the art. The use of the insulating film and the different materials for the electrodes facilitates layout of the devices.

Figure 7:
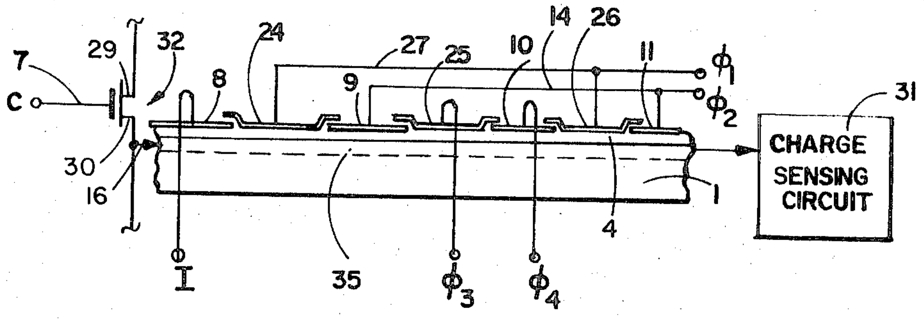
FIG. 7 is a schematic representation of an embodiment of a charge coupled circuit which can be produced by the process described herein.

FIG. 7 is a schematic representation of the FIG. 6 structure including block 31 representing a charge sensing circuit. The circuit described in the co-pending patent application referred to supra may be used as one embodiment of the circuit. Field effect transistor 32 including source and drain electrodes 29 and 30 connected to other circuitry (not shown) is controlled by a signal C on gate electrode 7. Minority carriers from region 16 (see FIG. 6) of electrode 30 enable the formation of an inversion layer under electrode 8 when an input signal I of appropriate magnitude is applied to the electrode.

Electrodes 24 and 26 interconnected by line 27 receive a control signal for example a $\phi_1$ clock signal. Electrodes 9 and 11, interconnected by line 14, are clocked by signal $\phi_2$. Electrode 24 overlaps electrodes 8 and 9. Control electrodes 25 and 10 each of which may also be paired with another electrode (not shown), receive clock signals $\phi_3$ and $\phi_4$ respectively. Electrode 10 is shown overlapped by electrodes 25 and 26.

Figure 8:
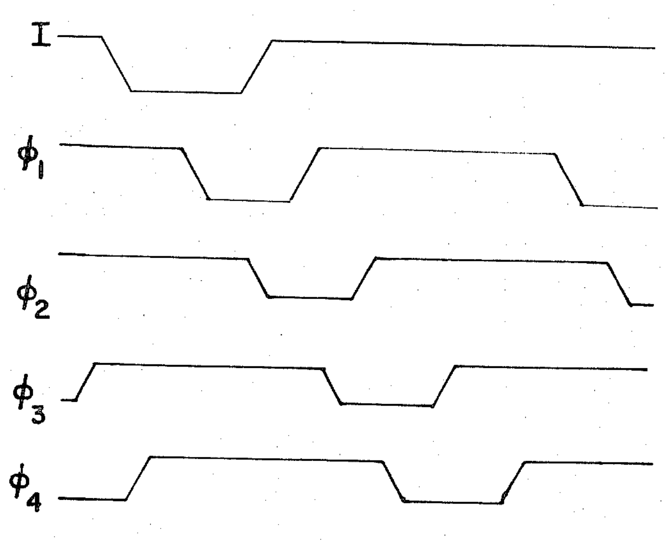
FIG. 8 shows overlapping (major-major) four phase clock signals as a function of time which can be used in coupling charge between electrodes of the FIG. 7 circuit.

The operation of the structure can best be understood by referring to FIG. 7 and the clock signal diagram of FIG. 8. When an input signal I is applied to electrode 8, minority carriers from region 16 enable an inversion layer to be formed under gate electrode 8. The inversion layer in the substrate is represented by dashed line 35. If field effect transistor 32 had been turned on for depleting region 16 of available minority carriers, a depletion region is formed under gate electrode 8. However, it is assumed that transistor 32 does not affect the operation being described. Clock signal $\phi_1$ becomes true before the end of the input signal. Therefore, the charge under electrode 8 is transferred within the substrate region to the inversion region under electrode 24.

Clock signal $\phi_2$ becomes true before the end of the true period of clock signal $\phi_1$, where by the charge stored in the substrate under electrode 24 is coupled or distributed to the substrate region under electrode 9. Clock signal $\phi_3$ becomes true before the end of the true period of clock signal $\phi_2$ thereby transferring the charge to the substrate region under electrode 25. Similarly, the true interval of clock signal $\phi_4$ occurs before the end of the true interval of clock signal $\phi_3$. This results in the transfer of the charge under electrode 25 to the substrate region under electrode 10. During the next true period of clock signal $\phi_1$, charge is coupled from the substrate regions under electrodes 8 and 10 to the substrate regions under electrodes 24 and 26, respectively. The charge stored under electrodes 24 and 26 is transferred to the substrate region under electrodes 9 and 11 respectively during the next true interval of the $\phi_2$ clock signal. This operation of charge transfer or propagation continues throughout the devices under the control of the clock signals and as a function of the input signal I. The state of the charge, i.e., the presence or absence of minority carriers under electrode 11 (the last or output electrode of the embodiment shown) is sensed by circuit 31 before the end of the true period of the $\phi_2$ clock signal on electrode 11.

In the preferred embodiment in which substrate 1 is comprised of a n-type single crystal silicon semiconductor, clock signals having negative voltage levels are applied for controlling the transfer of the charge from the region 16 to the substrate regions under the various electrodes of the charge coupled circuit. In other embodiments, where p-type materials are used, positive voltage levels may be utilized for transferring the charge.

In other embodiments, the strips 7–11 may be aluminum or a similar metal anodized to form films 19–23. Strips 24–26 may be semi-conductor material such as silicon, germanium etc. or a metal such as aluminum.

What is claimed is:

1. A process for producing adjacent electrodes on an insulation layer over a semiconductor substrate, said process comprising the steps of:

forming separated, polycrystalline semiconductor strips comprising a first group of electrodes on said insulation layer;

joining certain of said semiconductor strips to provide a common input line to said joined strips;

forming an insulating layer over said separated semiconductor strips by a process which does not change the thickness of said first insulation layer and which permits portions of said first insulating layer to remain exposed between adjacent second insulating layers;

forming a plurality of conducting metal strips, each metal strip being disposed upon an exposed portion of said first insulating layer and overlapping two adjacent semiconductor strips and insulated therefrom by said second insulating layer;

joining certain of said conducting metal strips to provide a common input line to said joined conducting metal strips;

forming a field effect transistor simultaneously with the formation of said semiconductor strips and said conducting metal strips, said transistor using one of the semiconductor strips as a control electrode whereby the source and drain regions of said field effect transistor are equally spaced on both sides of said control electrode and one of said regions provided the source of carriers for an adjacent electrode for enabling the substrate region subjacent said electrode to be inverted in the presence of input signals.

2. A process for producing adjacent electrodes over an upper face of a semiconductor substrate, said process comprising the steps of:

forming a silicon oxide film on the upper surface of said substrate;

forming a silicon nitride film on said silicon oxide film;

forming separated polycrystalline semiconductor strips on said silicon nitride film, said strips comprising a first group of electrodes;

joining certain of said semiconductor strips to provide a common input terminal to said joined strips;

forming an insulating silicon oxide layer over said separated semiconductor strips by in situ oxidation of the surface of the polycrystalline semiconductor strips whereby the thickness of the insulation comprised of said silicon oxide and silicon nitride films over said semiconductor substrate is unchanged by the process of forming the insulating layer over the semiconductor strips and whereby portions of said silicon nitride film remain exposed between adjacent second silicon oxide layers; forming a plurality of conducting metal strips, each metal strip being disposed upon an exposed portion of said silicon nitride film and overlapping two adjacent semiconductor strips and insulated therefrom by said second silicon oxide layers;

joining certain of said conducting metal strips to provide a common input terminal to said joined conducting metal strips;

forming a field effect transistor simultaneously with the formation of said semiconductor strips and said conducting metal strips, said transistor using one of the semiconductor strips as a control electrode whereby the source and drain regions of said field effect transistor are equally spaced on both sides of said control electrode and one of said regions comprises a source of carriers for an adjacent electrode for enabling the substrate regions subjacent said electrode to be inverted in the presence of appropriate input signals.

3. A process for producing adjacent closely spaced electrodes on a substantially planar insulating layer on an substantially planar surface of the substrate comprising the steps of:

forming a first layer of a metal on the insulation over the substrate;

removing portions of the first layer of metal to leave a plurality of metal strips, at least some of which are interconnected by said metal to yield a common terminal for a plurality of said electrodes;

anodizing said first group of electrodes to form an oxide layer on the surface thereof, leaving intermediate portions of said insulating layer exposed depositing a second layer of metal over the first set of electrodes and the oxide layer thereover and on said intermediate portions of said insulation layer between adjacent ones of said first electrodes;

removing portions of said second layer of metal to form a second group of electrodes interdigitated with said first group of electrodes, each of said second group of electrodes being disposed upon an intermediate portion and overlapping two adjacent electrodes of said first group but insulated therefrom by said oxide film, said oxide film determining the separation between adjacent electrodes of said first and second groups, at least some of said second set of electrodes being interconnected by an unremoved portion of said second metal layer to provide a common terminal for said electrodes.

4. The process recited in claim 3 wherein the first and second metal layers are aluminum.

* * * * *